United States Patent
Albrecht et al.

(10) Patent No.: US 6,591,034 B1
(45) Date of Patent: Jul. 8, 2003

(54) CONFIGURATION FOR SPATIALLY SEPARATING AND/OR JOINING OPTICAL WAVELENGTH CHANNELS

(75) Inventors: Helmut Albrecht, München (DE); Gerhard Heise, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/684,243

(22) Filed: Oct. 6, 2000

Related U.S. Application Data (63) Continuation of application No. PCT/DE99/01042, filed on Apr. 6, 1999.

(30) Foreign Application Priority Data

Apr. 6, 1998 (DE) .......................... 198 15 404

(51) Int. Cl.$^7$ ................................. G02B 6/28
(52) U.S. Cl. ............................. 385/24; 385/31; 385/32; 385/37
(58) Field of Search ................... 385/24, 31.32, 385/37, 39, 46

(56) References Cited

U.S. PATENT DOCUMENTS

| | | | | |
|---|---|---|---|---|
| 5,339,157 A | | 8/1994 | Glance et al. ............... | 385/24 |
| 5,412,744 A | | 5/1995 | Dragone ...................... | 385/24 |
| 5,440,416 A | * | 8/1995 | Cohen et al. ............... | 359/127 |
| 5,732,171 A | * | 3/1998 | Michel et al. .............. | 385/27 |
| 5,818,991 A | * | 10/1998 | Maerz et al. ............... | 385/50 |
| 5,881,199 A | * | 3/1999 | Li .............................. | 385/140 |
| 5,926,587 A | * | 7/1999 | Chen et al. ................. | 385/14 |
| 5,930,419 A | * | 7/1999 | Trouchet ..................... | 385/27 |
| 6,205,273 B1 | * | 3/2001 | Chen .......................... | 385/37 |
| 6,263,127 B1 | * | 7/2001 | Dragone et al. ............ | 385/24 |

FOREIGN PATENT DOCUMENTS

| | | |
|---|---|---|
| EP | 0 612 165 A1 | 8/1994 |
| EP | 0 613 263 A1 | 8/1994 |
| FR | 2 739 942 | 4/1997 |
| WO | WO 96/00915 | 1/1996 |
| WO | WO 97/10525 | 3/1997 |
| WO | WO 97/23969 | * 7/1997 |
| WO | WO 98/13718 | 4/1998 |

OTHER PUBLICATIONS

"Flat Spectral Response Arrayed–Waveguide Grating Multiplexer with Parabolic Waveguide Horns" (Okamoto et al.), Electronics Letters, vol. 32, No. 18, Aug. 29, 1996, pp. 1661–62.

"Arrayed–Waveguide Grating Multiplexer with Flat Spectral Response" (Okamoto et al.), Optics Letters, vol. 20, No. 1, Jan. 1, 995, pp. 43–45.

"Phased–Array Wavelength Demultiplexer with Flattened Wavelength Response" (Amersfoort et al.), Electronics Letters, vol. 30, No. 4, Feb. 17, 1994, pp. 300–301.

"Use of Multimode Interference Couplers to Broaden the Passband of Wavelength–Dispersive Integrated WDM Filters" (Soole et al.), IEEE Photonics Technology Letters, vol. 8, No. 10, Oct. 1996, pp. 1340–42.

(List continued on next page.)

*Primary Examiner*—Rodney Bovernick
*Assistant Examiner*—Juliana K. Kang
(74) *Attorney, Agent, or Firm*—Laurence A. Greenberg; Werner H. Stemer; Ralph E. Locher (57) ABSTRACT

A configuration for spatially separating and/or joining at least two optical wavelength channels includes an optical phased array device which has a device for producing an attenuation function for a wavelength-dependent attenuation of the transmission function of at least one of the waveguides which is provided solely for a respective one of the channels and/or of the waveguide which is provided jointly for all the channels.

3 Claims, 5 Drawing Sheets

OTHER PUBLICATIONS

"Multigrating Method for Flattened Spectral Response Wavelength Multi/Demultiplexer" (Rigny et al.), Electronics Letters, vol. 33, No. 20, Sep. 25, 1997, pp. 1701–02.

"Waveguide Grating Routers with Greater Channel Uniformity" (Chen et al.), Electronics Letters, vol. 33, No. 23, Nov. 6, 1997.

"Passband–Flattened Arrayed–Waveguide Grating Design Using an Aspheric Output Star Coupler" (Parker et al.), SPIE, Vo. 3491, pp. 80–84.

"Multiport Wavelength Routers Using Multimode Interference" (Okayama et al.), Optical Engineering, vol. 36, No. 4, Apr. 1997, pp. 1078–81.

* cited by examiner

CONFIGURATION FOR SPATIALLY SEPARATING AND/OR JOINING OPTICAL WAVELENGTH CHANNELS

CROSS-REFERENCE TO RELATED APPLICATION

This application is a continuation of copending International Application No. PCT/DE99/01042, filed Apr. 6, 1999, which designated the United States.

BACKGROUND OF THE INVENTION

Field of the Invention

The invention relates to a configuration for spatially separating and/or joining at least two optical wavelength channels.

In special embodiments of such configurations, the grating device, which is used both, for separating and for joining the channels, has an optical grating and an optical free-radiating region which is provided between the grating and a point in space, which is assigned jointly to all the channels. The grating device also has a further optical free-radiating region which is provided between the grating and each point in space, which is assigned solely to one channel.

In one special embodiment of such a type, the grating includes a phased array, that is to say a plurality of strip-like optical waveguides, each of which has in each case one end surface which faces the point in space which is assigned jointly to all the channels, in each case one other end surface which faces the points in space each of which is assigned solely to in each case one channel, and in each case one optical length between the one end surface and the other end surface, which varies from waveguide to waveguide.

If the special embodiment is operated as a demultiplexer in which the channels are spatially separated, the one end surfaces of the waveguides of the phased array form entry openings of the grating, and the other end surfaces of these waveguides form outlet openings of the grating. If this embodiment is operated as a multiplexer, in which the spatially separated channels are joined, the other end surfaces of the waveguides of the phased array form entry openings of the grating and the first end surfaces of these waveguides form outlet openings of the grating. The waveguides of the phased array act as an optical phase grating in any case.

Instead of a grating in the form of a phased array, other optical gratings, for example etched gratings, may also be used (see IEEE, Photonics Technology Lett., Vol. 8, No. 10, October 1996, pages 1340 to 1342).

The grating device of such a configuration governs a wavelength-dependent transmission function for each strip-like optical waveguide which is assigned solely to one channel or is assigned jointly to all the channels and has an end surface which faces the grating device and is provided at that point in space which is assigned solely to one channel or jointly to all the channels. At least to a first approximation, this transmission function is a Gaussian function (see IEEE, Photonics Technology Lett., Vol. 8, No. 10, October 1996, pages 1340 to 1342).

It would be preferable for the wavelength-dependent transmission function of such a waveguide to have a more rectangular profile in order that the insertion loss of this waveguide varies only insignificantly in a specific wavelength band when fluctuations occur in the ambient temperature and/or wavelength.

Various options have been described for flattening the inherent Gaussian-like transmission function of such a waveguide, that is to say to configure the transmission function such that it is more rectangular.

For example, it is known from the "Electronics Letters", 30, 1994, pages 300–301 for the waveguide which is assigned solely to one channel to be configured as a multi-mode waveguide rather than as a monomode waveguide, as usual, in order to flatten its transmission function.

It is also known for two slightly different phased arrays to overlap or be interleaved with one another so that, at the point in space in the configuration which is assigned solely to one channel, two spectrally deliberately shifted Gaussian-like transmission functions are superimposed to form a broader, flattened transmission function.

It is also known for a configuration to be configured such that, at the point in space in the configuration which is assigned jointly to all the channels, two overlapping Gaussian-like transmission functions are present. This can be achieved with a 3-dB beam splitter (see U.S. Pat. No. 5,412,744), with a so-called "Multimode-Interference" coupler (see IEEE, Photonics Technology Lett., Vol. 8, No. 10, October 1996, pages 1340 to 1342) and/or with a so-called "horn" structure (see Electronics Letters, 32, 1996, pages 1661–1662). The flattened transmission function produced at this point in space, in the form of the two overlapping Gaussian-like transmission functions, is mapped by the grating device onto each point in space in the configuration which is assigned solely to one channel.

In the three last-mentioned implementations, the critical process in the flattening is the formation of a convolution integral from an electrical field distribution in accordance with the overlapping Gaussian-like transmission functions, with the Gaussian mode of each waveguide configuration assigned solely to one channel.

It is known from the "Optics Letters", 20, 1995, pages 43–45 for the electrical field distribution to be varied at the other end surfaces of the waveguides of the phased array which form the outlet openings of the grating. The basis of this implementation is that the free-radiating region provided between these end surfaces and the separate points in space assigned solely to in each case one channel has a lens effect, and the electrical field distribution close to these end surfaces and the electrical field distribution close to these separate points in space are thus linked via a Fourier transformation. With a suitable choice of the cross-section of the waveguides of the phased array and an additional change to the optical length of these waveguides, it is possible to produce an electrical field distribution with, correspondingly, a sin(x)/x function close to the other end surfaces of these waveguides. This function is transformed by the Fourier transformation to a rectangular field distribution at a separate point in space.

SUMMARY OF THE INVENTION

It is accordingly an object of the invention to provide a configuration for spatially separating and/or spatially joining at least two optical wavelength channels which overcomes the above-mentioned disadvantages of the heretofore-known configurations of this general type and which can be easily constructed and in which, in a waveguide having an end surface provided at a point in space in the configuration, the wavelength-dependent transmission function of this waveguide can be adjusted easily and freely, without any spectral spreading of this function.

With the foregoing and other objects in view there is provided, in accordance with the invention, a configuration for spatially separating and/or spatially joining at least two optical wavelength channels, including:

an optical grating device defining a common spatial point, the optical wavelength channels having respective first optical powers commonly assigned to the common spatial point;

the optical grating device further defining separate spatial points assigned solely to respective ones of the optical wavelength channels, the optical wavelength channels having respective second optical powers respectively concentrated at the separate spatial points, and the optical grating device linking the respective first optical powers and the respective second optical powers;

strip-shaped optical waveguides optically coupled to the optical grating device, each of the strip-shaped optical waveguides being assigned solely to a respective one of the optical wavelength channels;

the strip-shaped optical waveguides having respective end faces respectively disposed at the separate spatial points assigned to the respective ones of the optical wavelength channels, the respective second optical powers being at least partially coupled to the strip-shaped optical waveguides;

the strip-shaped optical waveguides having respective wavelength-dependent transmission functions partly determined by the optical grating device;

an attenuator for providing an attenuation function for a wavelength-dependent attenuation of at least one of the respective wavelength-dependent transmission functions; and the attenuator including an optical stop filter acting on an optical power transmitted in at least one of the strip-shaped optical waveguides assigned to the at least one of the respective wavelength-dependent transmission functions attenuated with the attenuation function, the optical stop filter having a wavelength-dependent filter curve forming the attenuation function.

This embodiment has the advantage that the grating device may remain unchanged and there is no need for any beam splitters, multimode interference couplers, horn structures or duplication of phased array structures.

With the objects of the invention in view there is also provided, a configuration for spatially separating and/or spatially joining at least two optical wavelength channels, including:

an optical grating device defining a common spatial point, the optical wavelength channels having respective first optical powers commonly assigned to the common spatial point;

the optical grating device further defining separate spatial points assigned solely to respective ones of the optical wavelength channels, the optical wavelength channels having respective second optical powers respectively concentrated at the separate spatial points, and the optical grating device linking the respective first optical powers and the respective second optical powers;

strip-shaped optical waveguides optically coupled to the optical grating device, each of the strip-shaped optical waveguides being assigned solely to a respective one of the optical wavelength channels;

the strip-shaped optical waveguides having respective end faces respectively disposed at the separate spatial points assigned to the respective ones of the optical wavelength channels, the respective second optical powers being at least partially coupled to the strip-shaped optical waveguides;

the strip-shaped optical waveguides having respective wavelength-dependent transmission functions partly determined by the optical grating device;

an attenuator for providing an attenuation function for a wavelength-dependent attenuation of at least one of the respective wavelength-dependent transmission functions; and the attenuator including an attenuation device disposed in the grating device, the attenuation device attenuating an optical power of one of the optical waveguide channels in a position-resolved manner.

According to the above-defined solutions, the configuration according to the invention has only one additional device for producing an attenuation function for a wavelength-dependent attenuation of the transmission function of at least one waveguide having an end surface provided at a point in space in the configuration.

The wavelength-dependent attenuation function produced by the device is superimposed on a given transmission function of the waveguide and, through the use of this superimposition, is, converted to a different transmission function of this waveguide.

The wavelength-dependent attenuation function may be chosen freely so that, in principle, any desired transmission function of a waveguide can be produced from a given transmission function of this waveguide.

In particular, a flattened transmission function of the waveguide can be produced from a given transmission function of the waveguide which, for example like a Gaussian function, has a spike or a peak, by using an attenuation function which reduces the function values of the transmission function in the vicinity of the spike or peak to approximately constant function values. In this case, there is no need for any spectral spreading of the transmission function of the waveguide.

After this, the upper part of a given transmission function is cut off flat, thus providing the major advantage, in comparison with known configurations described above, that the solution according to the invention does not lead to any spreading of the transmission functions and the crosstalk characteristics of the configuration are thus not influenced by the flattening process.

Furthermore, the flattehing process according to the invention can advantageously be matched to a spectral width.

The stop filter can be produced in the relevant waveguide in a simple manner, for example in the form of a Bragg grating, for example with an excimer laser and phase masks, or holographically.

In consequence, it is advantageously possible to produce a stop filter, in accordance with customer requirements, for any waveguide channel with a different bandwidth and attenuation in a waveguide assigned to this channel wherein, advantageously, the flattening of the transmission function for each of these waveguides can be adjusted as required by the customer.

Irrespective of whether the configuration according to the invention is operated as a demultiplexer or a multiplexer, for each wavelength channel the stop filter can be configured in the waveguide which is assigned solely to this channel and/or in the waveguide which is assigned jointly to all the wavelength channels.

In accordance with a preferred feature of the invention, the attenuation device which is formed in the grating device for attenuating an optical power which is transmitted in the grating device can advantageously have an optical stop filter which extends transversely with respect to a propagation direction of the optical power and has a position-resolved transmission characteristic, which can be implemented in different ways.

In accordance with another feature of the invention, the grating device has an optical grating and defines a first optical free-radiating region and a second-optical free-radiating region. The first optical free-radiating region is provided between the common spatial point and the optical grating. The second optical free-radiating region is provided between the optical grating and the separate spatial points.

In accordance with yet another feature of the invention, the optical grating includes a plurality of further strip-shaped optical waveguides. The further strip-shaped optical waveguides have respective first end faces, respective second end faces, and respective optical lengths between the first and second end faces. The first end faces face the common spatial point, the second end faces respectively face the separate spatial points, and the optical lengths of the further strip-shaped optical waveguides differ from one another.

Other features which are considered as characteristic for the invention are set forth in the appended claims.

Although the invention is illustrated and described herein as embodied in a configuration for a spatial separation and/or joining of optical wavelength channels, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
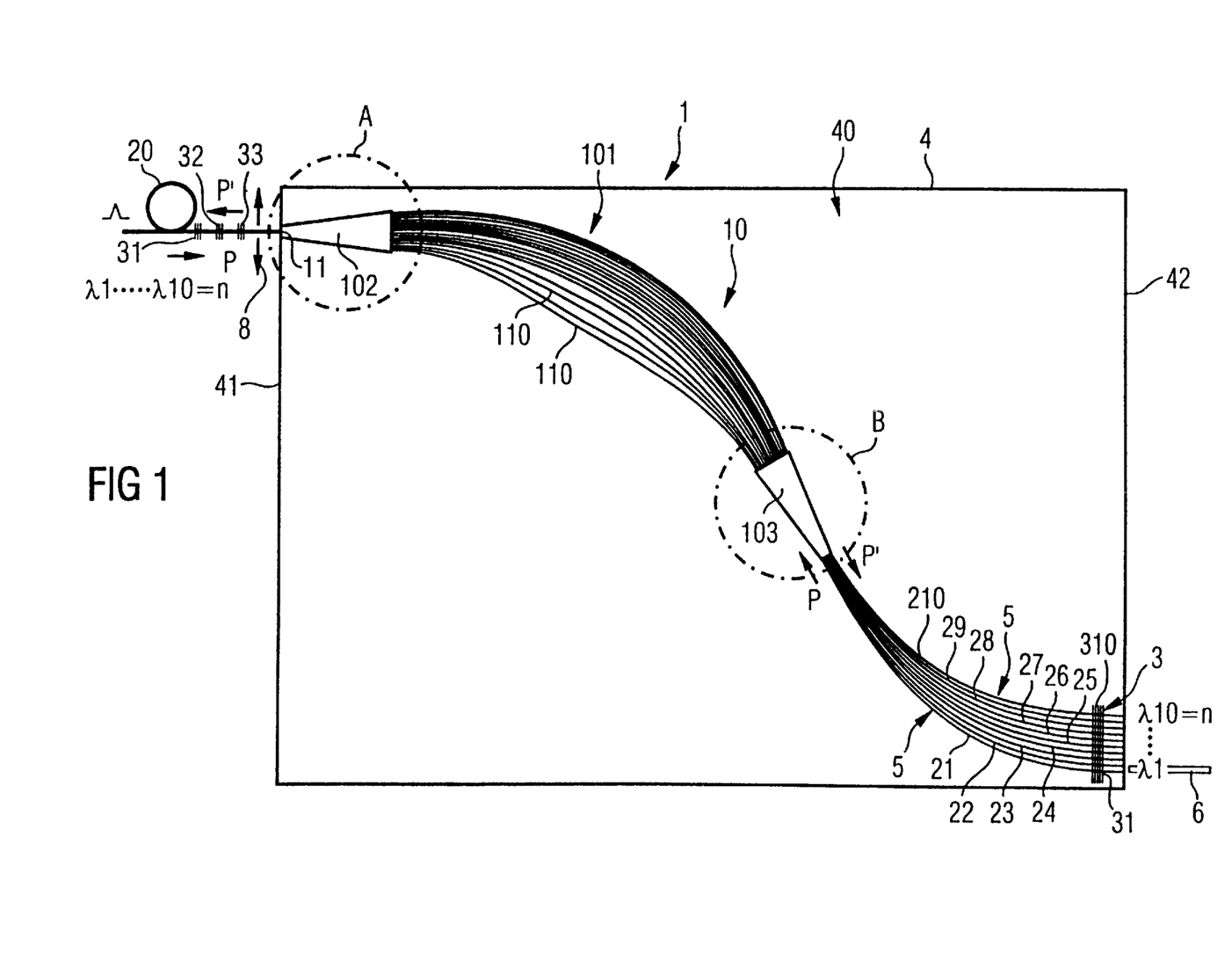
FIG. 1 is a diagrammatic plan view of a first exemplary embodiment of a configuration according to the invention for spatially separating and/or joining wavelength channels.

Referring now to the figures of the drawings in detail and first, particularly, to FIG. 1 thereof, there is shown an exemplary embodiment of a configuration 1 according to the invention. Without limiting the general concept of the invention, the configuration 1 is specifically based on the advantageous configuration for spatially separating and/or joining at least several optical wavelength channels $\lambda 1$, $\lambda 2, \ldots \lambda n$ as described in International Publication No. WO 96/00915.

According to this, in the example according to the invention illustrated in FIG. 1, in a similar way to that with the conventional configuration, on the surface 40 of a substrate 4 between a substrate edge 41 and another essentially parallel substrate edge 42, there are provided an optical free-radiating region 102 which is assigned to the one substrate edge 41 and is in the form of a layer waveguide, and an optical free-radiating region which is spatially separate from this layer waveguide 102 and is assigned to the other substrate edge 42 and is in the form of another layer waveguide 103, an optical phase shifter configuration in the form of a phased array 101 including a plurality of strip-like optical waveguides 110 running in a curve and having a variable optical length from waveguide 110 to waveguide 110, and an output and/or injection configuration 5 including a number of strip-like optical waveguides 21, 22, ... 2n corresponding to the number n of: channels $\lambda 1, \lambda 2, \lambda n$, which, for example, run in an opposite curve to the waveguides 110 in the phased array 101, wherein in general the number n of channels is chosen to be less than the number of waveguides 110 in the phased array 101.

For example, the number n of channels is chosen to be equal to 10, and the number of waveguides 110 in the phased array 101 is chosen to be equal to 15, although the number of waveguides 110 may be considerably greater than 15.

Figure 2:
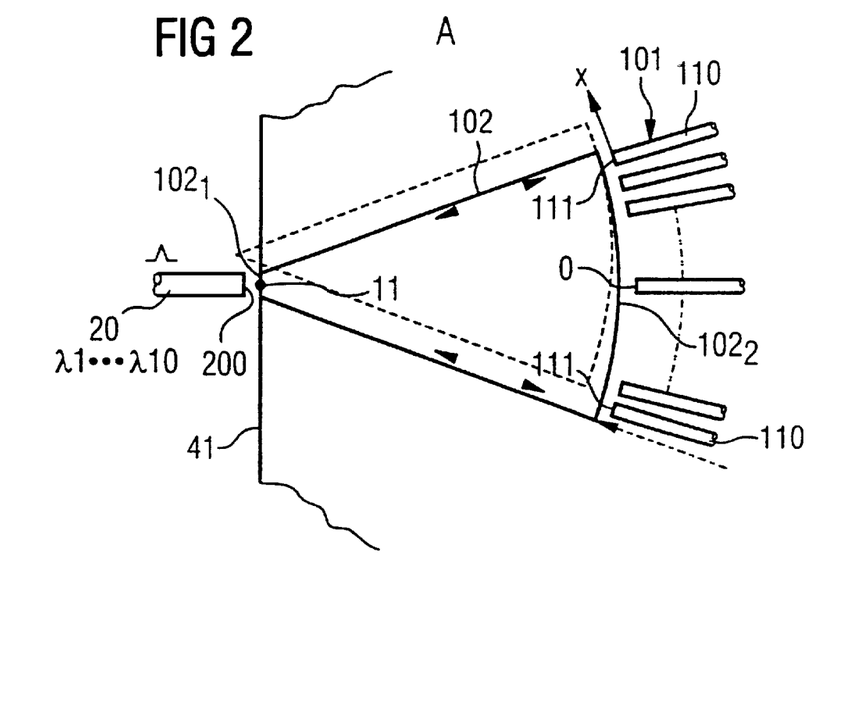
FIG. 2 is an enlarged view of a detail A in FIG. 1.
Figure 3:
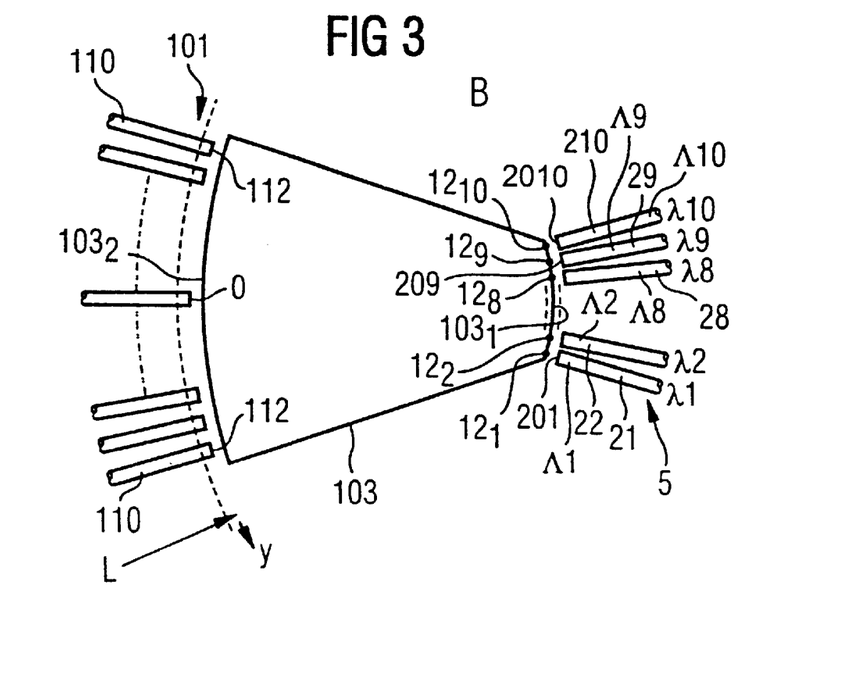
FIG. 3 is an enlarged view of a detail B in FIG. 1.

Each of the strip-like optical waveguides 110 shown in FIGS. 2 and 3 has an end surface 111 which is opposite an end surface $102_2$, facing the phased array 101, of the one layer waveguide 102, and is opposite in each case one other end surface 112 on the one end surface $103_2$, facing the phased array 101, of the other layer waveguide 103.

The optical length L of each waveguide 110, which varies from waveguide 110 to waveguide 110, is measured between the one end surface 111 and the other end surface 112 of this waveguide 110 and is in each case defined by the product of an effective refractive index of each waveguide 110 and its longitudinal axial geometric length between its end surfaces 111 and 112.

The one layer waveguide 102 has an end surface $102_1$ which faces away from the phased array 101, is terminated for example with the one substrate edge 41 and in which a point 11 is located through which all the channels $\lambda 1$ to $\lambda 10$ can be coupled into the one layer waveguide 102 and/or can be output from it.

The other layer waveguide 103 has an end surface $103_1$ which faces the output and/or injection configuration 5 and faces away from the phased array 101 and in which in each case one separate point $12_i$ is located per channel $\lambda i$ (i=1 to 10), at which only the optical power P of this channel $\lambda i$ which is concentrated on the point 11 in the end surface $102_1$ of the one layer waveguide 102 and is injected into this layer waveguide 102, is reconcentrated from the phased array 101 by the other layer waveguide 103. The point $12_i$ is assigned solely to the channel $\lambda i$.

Conversely, an optical power P in each channel $\lambda i$, which is concentrated at the point $12_i$ (assigned solely to this channel $\lambda i$) in the end surface $103_1$ of the other layer waveguide 103 and is injected into this layer waveguide 103 is reconcentrated from the phased array 101 by the layer waveguide 102 at the point 11 in the end surface $102_1$ of this layer waveguide 102. The point 11 is accordingly assigned jointly to all the channels $\lambda i$.

The reconcentrated optical power of one channel $\lambda i$ may differ from the injected concentrated optical power P and will therefore be designated P'.

The phased array 101 together with the layer waveguides 102 and 103 form the optical grating device 10 in the example shown in FIG. 1, with the point 11 being the point in space in the grating device assigned jointly to all the channels $\lambda i$, and each separate point $12_i$ being a point in space in the grating device 10 which is assigned solely to the channel $\lambda i$.

The phased array 101 forms an optical grating in the grating device 10 in the form of a phase grating, the one layer waveguide 102 forms an optical free-radiating region which is provided between the point in space 11 which is common to all the channels $\lambda i$ and the grating 101, and the other layer waveguide 103 forms an optical free-radiating region which is provided between the grating 101 and each point $12_i$ which is assigned solely to one channel $\lambda i$.

The output and/or injection configuration 5 has, per channel $\lambda i$, in each case one strip-like optical waveguide 2i (21, 22, 23, . . . ) which is assigned solely to this channel $\lambda i$ and has an end surface 20i (201, 202, 203, . . . ), which is provided close to the point in space $12_i$ which is assigned solely to this channel $\lambda i$ and through which the optical power P', reconcentrated at this point $12_i$, of this channel $\lambda i$ is at least partially injected into this waveguide 2i when the configuration is operated as a demultiplexer.

Each waveguide 2i in the output and/or injection configuration 5 has a wavelength-dependent transmission function $\Lambda i$ which is also governed by the grating device 10.

Figure 4:
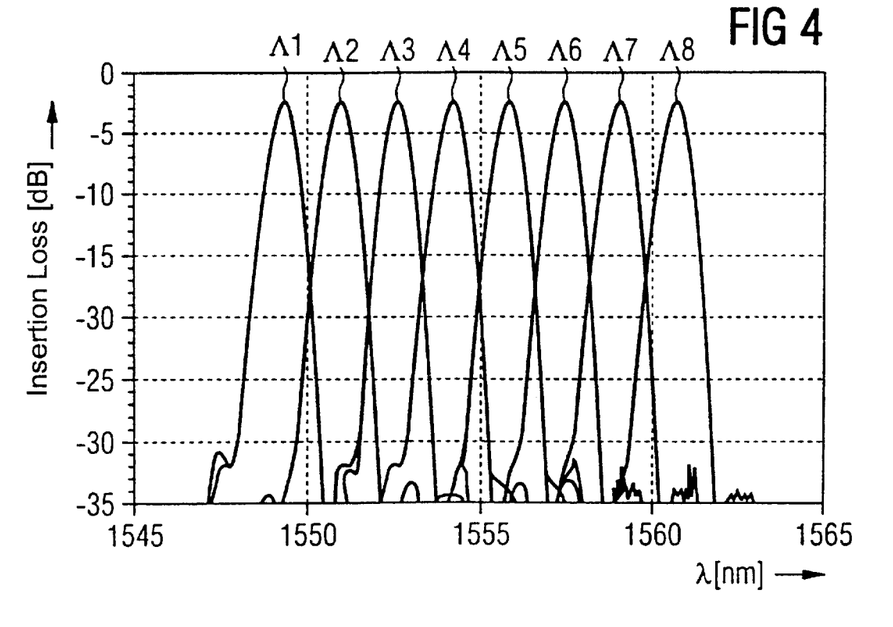
FIG. 4 is a graph illustrating typical wavelength-dependent transmission functions per channel of the configuration shown in FIG. 1, without a flattening.

Instead of showing 1 to 10 typical wavelength-dependent transmission functions, FIG. 4 shows $\Lambda i$ of the waveguides 2i of the output and/or injection configuration 5 from the example shown in FIG. 1 for the situation i=1 to 8. The optical wavelength $\lambda$ is plotted on the abscissa, and the insertion loss or insertion attenuation on the ordinate. Each transmission function $\Lambda i$ is associated solely with the waveguide 2i and the channel $\lambda i$. The example is based on a channel separation of 200 GHz.

Each of these transmission functions $\Lambda i$ is similar to a Gaussian function.

According to the invention, the configuration shown in FIG. 1 has a device 3 for producing an attenuation function $\Lambda_s$ for a wavelength-dependent attenuation of the transmission function $\Lambda i$ of at least one waveguide 2i.

Figure 5:
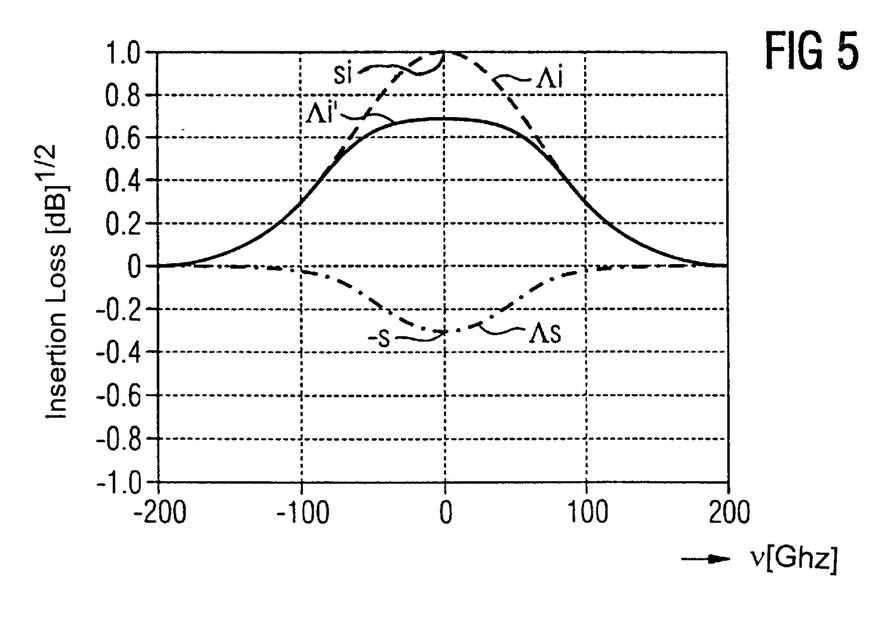
FIG. 5 is a graph illustrating an example of a wavelength-dependent transmission function for a channel without flattening, an example of a wavelength-dependent attenuation function according to the invention, and a flattened transmission function resulting from the example of the transmission function using the attenuation function.

The method of operation of the attenuation function $\Lambda_s$ will be explained with reference to FIG. 5. FIG. 5 shows an example of the wavelength-dependent transmission function $\Lambda i$ of the waveguide 2i for a single waveguide 2i in the output and/or injection configuration 5, and thus for the individual channel $\lambda i$, schematically.

This transmission function $\Lambda i$ is Gaussian-like and, in contrast to FIG. 4, is shown in a coordinate system in which the optical frequency $\nu$ rather than the wavelength is plotted on the abscissa and the square-root of the insertion loss is plotted on the ordinate. The point 0 on the abscissa corresponds to the central wavelength $\lambda i$ of the wavelength channel with the same designation, and shows the position of a peak si of the transmission function $\Lambda i$ on the abscissa.

The device 3 produces the attenuation function $\Lambda_s$ which is superimposed on the transmission function $\Lambda i$. Subtraction of the attenuation function $\Lambda_s$ from the transmission function $\Lambda i$ gives the new transmission function $\Lambda i'$ which is flattened in the vicinity of 0 on the abscissa in comparison with the original transmission function $\Lambda i$.

The flattening is obtained by a suitable selection of the curve profile of the attenuation function $\Lambda_s$, in particular by the attenuation function $\Lambda_s$ having a negative peak −s at the point 0 on the abscissa. Attenuation functions $\Lambda_s$ with a Gaussian, parabolic or trigonometric profile are particularly suitable for this case. In general, for a given transmission function $\Lambda i$ or $\Lambda$ and a desired transmission function $\Lambda i'$ or $\Lambda'$, the attenuation functions $\Lambda_s$ can be established such that the desired transmission function $\Lambda i'$ or $\Lambda'$ is subtracted from the given transmission function $\Lambda i$ or $\Lambda$.

In the example in FIG. 1, the device 3 for producing the attenuation function $\Lambda_s$ for a wavelength-dependent attenuation of the transmission function $\Lambda i$ of a waveguide 2i is provided in a simple manner through the use of an optical stop filter 3i which acts on an optical power P or P' transmitted in this waveguide 2i and has a wavelength-dependent filter curve, which forms the attenuation function $\Lambda_s$.

By way of example, in each case one stop filter 3i is formed in each waveguide 2i (i=1 to 10), whose filter curve $\Lambda_s$ is matched to the transmission function $\Lambda i$ of this waveguide 3i. FIG. 1 shows only the stop filter 31 in the waveguide 21, and the stop filter 310 in the waveguide 210.

A stop filter 3i for one or a number of channels or each channel $\lambda i$ may also be formed in a strip-like optical waveguide 20 assigned jointly to all the channels $\lambda i$ and having an end surface 200, which is provided at the point in space 11 assigned jointly to all the channels $\lambda i$ and has a wavelength-dependent transmission function $\Lambda$ which is also governed by the grating device 10. Stop filters 3i for different channels $\lambda i$ must be provided one behind the other in this waveguide 20 in a propagation direction of optical power P or P' in the the waveguide 20. For the sake of simplicity, FIG. 1 shows only three such stop filters, which are denoted 31, 32 and 33.

A stop filter 3i for a channel $\lambda i$ may be formed either in the associated waveguide 2i or in the waveguide 20 or in the waveguide 2i and in the waveguide 20.

A stop filter 3i can be formed in any type of strip-like waveguide. Strip-like waveguide in this case means any waveguide in which optical power P or P' propagates essentially in only one direction. This includes both integrated strip waveguides and optical fibers.

In the example in FIG. 1, the waveguides 2i are integrated strip waveguides, while the waveguide 20 is a system fiber, which is likewise monomode.

A stop filter 3i can also be formed in a fiber 6 coupled to a waveguide 2i.

A Bragg grating is highly suitable as a stop filter 3i, which can be produced in a strip-like waveguide by mask exposure and/or holographically.

Both when the configuration shown in FIG. 1 is operated as a demultiplexer and when it is operated as a multiplexer, each waveguide 2i and the waveguide 20 has a flattened transmission function.

When this configuration is operated as a demultiplexer, optical power P from each channel $\lambda i$ to be separated is supplied through the waveguide 20 to the point in space 11 which is assigned jointly to all the channels, and optical power P' of this channel $\lambda i$ transmitted to the waveguide 2i assigned solely to this channel $\lambda i$ is taken from this waveguide 2i. When operated as a multiplexer, optical power P from each channel $\lambda i$ to be joined is supplied through the waveguide 2i assigned solely to this channel $\lambda i$ only to the point in space assigned solely to this channel λi, and optical power P' of this channel λi transmitted to the waveguide 20 assigned to all the channels λi is taken from this waveguide 20.

Figure 6:
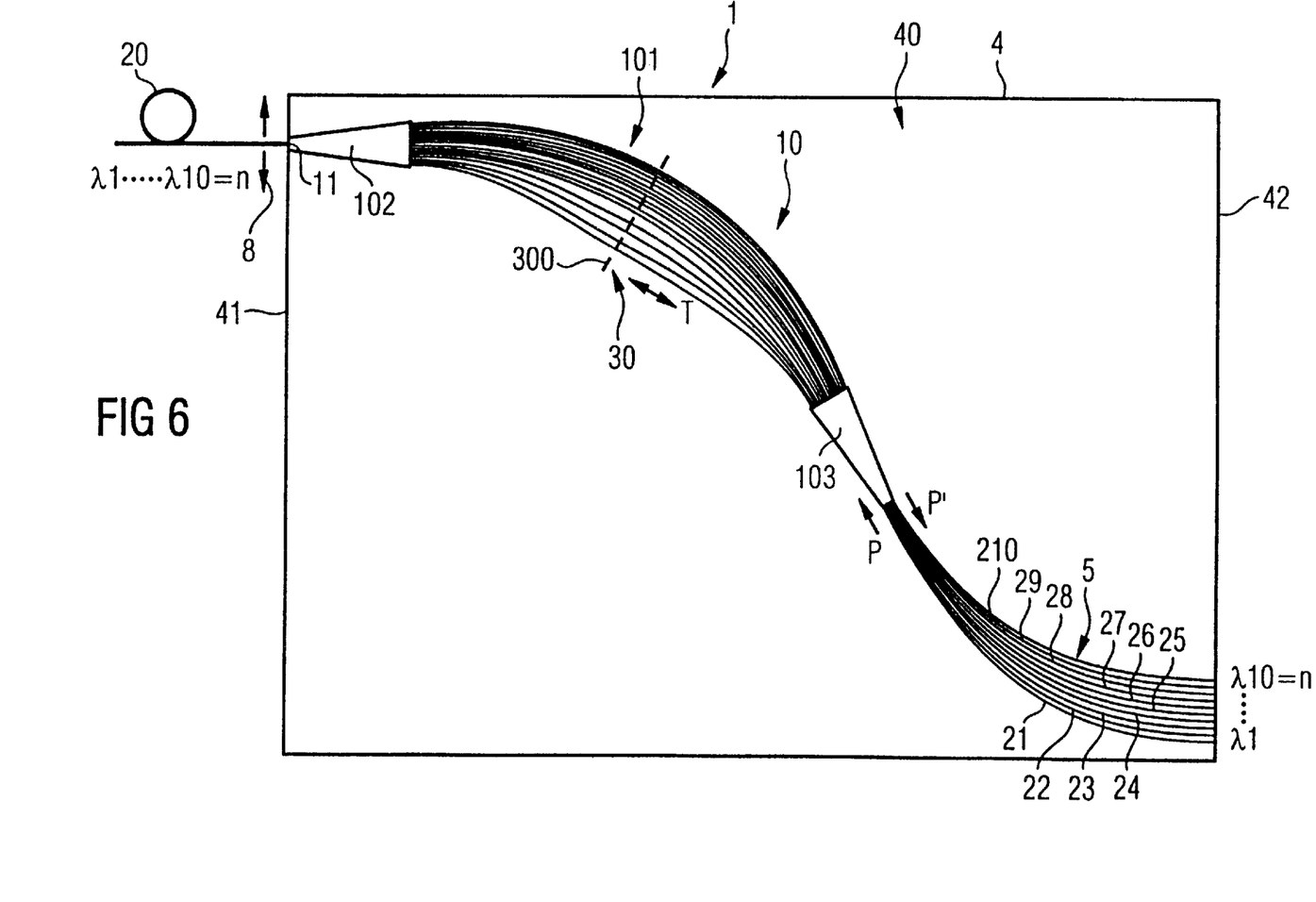
FIG. 6 is a diagrammatic plan view of a modification of the exemplary embodiment of a configuration according to the invention as shown in FIG. 1, with the device for producing the attenuation function having an apparatus formed in the grating device for a general attenuation of a transmitted optical power in each channel.

The example of the configuration according to the invention shown in FIG. 6 differs from the example shown in FIG. 1 only by having a different implementation of the device 3 for producing the attenuation function $\Lambda_s$. This device 3 has no stop filters 3i formed in the waveguides 2i and 20, but has an apparatus 30 which is formed in the grating device 10 and attenuates an optical power P transmitted in the grating device 10 on a position-resolved basis.

This example is based on the free-radiating regions 102 and 103 each having a lens effect and carrying out a Fourier transformation. An optical field distribution concentrated on the point in space 11 is spatially distributed, after injection into the free-radiating region 102, onto the one end surfaces 111 (provided along a line x, see FIG. 2) of the waveguides 110 in the phased array 101, with the field distribution along the line x being linked with the concentrated field distribution at the point 11.

A proportion of the optical power P which is supplied to the one end surfaces 111 is injected into each waveguide 110 in the phased array 101 and is transmitted to the other end surface 112 of this waveguide 110. In consequence, there is in each case one individual optical field distribution, concentrated onto this surface 112, at each of the other end surfaces 112. The other end surfaces 112 are provided along a line y (FIG. 3). The individual field distributions in the other end surfaces 112 have, along the line y, an envelope which is the same as the field distribution along the line x. The other end surfaces 112 in this case form the outlet openings of the grating 101, which means that, for each channel λi, the optical power P' of this channel λi emerging from all the other end surfaces 112 is transmitted in the free-radiating region 103 and is concentrated at the point 12i, which is assigned solely to this channel λi.

The optical field distribution concentrated at this point 12i, and the envelope along the line y, are respectively linked to one another by a Fourier transform.

A similar situation applies to the converse case, in which the power P originates from a point 2i and is reconcentrated via an envelope curve along the line x at the point 11, that is to say in the multiplexing case.

By attenuating the envelope curve along the line y or x and/or the field distribution along the line x or y and/or the optical power P transmitted in the direction x or y in the waveguides 110 in the phase array 101, the wavelength-dependent transmission characteristic Λi and Λ can be varied in a desired manner, in particular flattened.

One option for achieving position-resolved attenuation of the envelope curve is the configuration of the waveguides 110 in the phased array 101. This relates to the shape and/or the dimensions of the waveguides 110 and/or to the configuration of the waveguides 110 on their one end surfaces 111 and/or the other end surfaces 112 and/or in the profile of the waveguides 110 between the one end surface 111 and the other end surface 112.

In one preferred embodiment of the configuration shown in FIG. 6, the apparatus 30 formed in the grating device 10 in order to attenuate an optical power P has an optical stop filter 300 which extends transversely with respect to a propagation direction r of the optical power P, and a position-resolved transmission characteristic which ensures the desired envelope curve profile. The stop filter 300 can be provided by a small plate which is provided opposite the one end surfaces 111 of the waveguides 110 in the phased array 101 and/or opposite the other end surfaces 112 of these waveguides 110 and/or in these waveguides 110.

Figure 7:
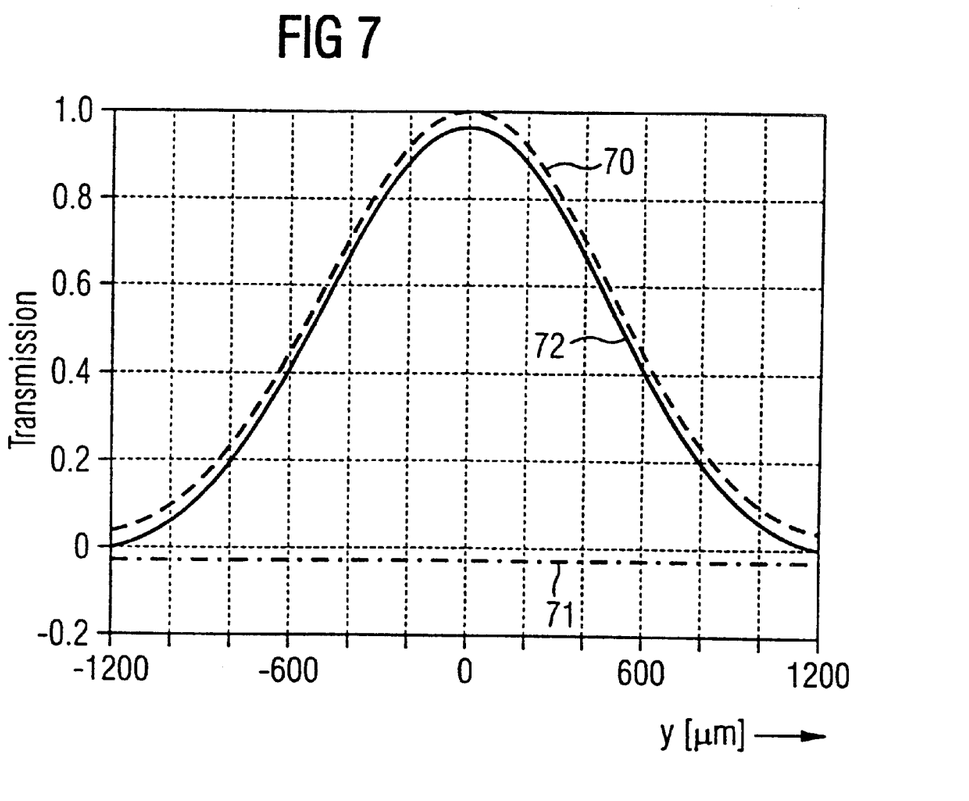
FIG. 7 is a graph illustrating an exemplary envelope curve of the optical field functions in the outlet openings of a grating of the grating device, an attenuation function for attenuation of the field functions, a new envelope curve resulting from this attenuation and a resulting transmission function for one channel.

FIG. 7 shows an example of an envelope curve 70 along the line y in FIG. 3 (or x in FIG. 2). The line y forms the abscissa, and the optical transmission is plotted on the ordinate. The envelope curve 70 is essentially Gaussian, has a peak on the line y at the point which marks a central waveguide 110 in the phased array 101 and which is denoted by 0, and has a minimum transmission in each case, which is however not 0, at the waveguides 110 in the phased array 101 which are furthest away from the point 0 on both sides.

The apparatus 30 or the stop filter 300 has a transmission characteristic 71 which is position-resolved along the line y, attenuates the envelope curve 70, and thus attenuates the transmitted optical power over the line y.

The transmission characteristic 71 attenuates the envelope curve 70 such that the transmission is equal to zero-in those waveguides 110 in the phased array 101 which are furthest away from the point 0 on both sides, and it is reduced at the point 0.

For example, the attenuating transmission characteristic 71 along the line y is essentially constant. This constant characteristic 71 results. in the attenuated envelope curve 72, which is similar to the original transmission characteristic 70 but has a comparatively low transmission level throughout.

The Fourier transform of the attenuated envelope curve 72 gives, for each channel λi, a transmission function Λi' which is attenuated in comparison with the original transmission function Λi of the waveguide 2i assigned to this channel λi.

In order to produce an attenuated transmission function Λi' which is flattened in comparison with an original Gaussian transmission function Λi, the position-resolved attenuation transmission characteristic 71 must be shaped such that it is equal to the Fourier transform of the attenuation function $\Lambda_s$ which produces this flattening. In general, for a given transmission function Λi or Λ and desired transmission function Λi' or Λ', it can be assumed that the attenuation function $\Lambda_s$ is established by subtraction of the desired transmission function Λi' or Λi from the given transmission function Λi or Λ, and the Fourier transform of the subtraction result is then formed, or that the Fourier transform of the desired transmission function Λi' or Λ' is subtracted from the Fourier transform of the given transmission function Λi or Λ.

The desired transmission function should be chosen so that it is not exactly rectangular. A flattened Gaussian-like transmission function Λi' or Λi is useful, since such a function is better matched to the Gaussian-like mode of a waveguide 2i or 20.

The double arrow 8 in FIGS. 1 and 6 indicates an advantageous but in principle not essential compensation device to compensate for any temperature dependency of the configuration, as is for example proposed in International Application No. PCT/DE 97/02196 published after the effective date of the instant application.

We claim:

1. In a system having at least two optical wavelength channels, a configuration for at least one of spatially separating and spatially joining the at least two optical wavelength channels, comprising:

an optical grating device defining a common spatial point, the optical wavelength channels having respective first optical powers commonly assigned to the common spatial point, said optical grating device additionally defining a propagation direction for optical power transmitted in said optical grating device;

said optical grating device further defining separate spatial points assigned solely to respective ones of the optical wavelength channels, the optical wavelength channels having respective second optical powers respectively concentrated at the separate spatial points, and said optical grating device linking the respective first optical powers and the respective second optical powers;

strip-shaped optical waveguides optically coupled to said optical grating device, each of said strip-shaped optical waveguides being assigned solely to a respective one of the optical wavelength channels;

said strip-shaped optical waveguides having respective end faces respectively disposed at the separate spatial points assigned to the respective ones of the optical wavelength channels, the respective second optical powers being at least partially coupled to said strip-shaped optical waveguides;

said strip-shaped optical waveguides having respective wavelength-dependent transmission functions partly determined by said optical grating device;

an attenuator for providing an attenuation function for a wavelength-dependent attenuation of at least one of the respective wavelength-dependent transmission functions; and said attenuator including an attenuation device disposed in said optical grating device, said attenuation device attenuating an optical power of one of the optical waveguide channels in a position-resolved manner, said attenuation device further including an optical stop filter extending transversely with respect to the propagation direction and having a position-resolved transmission characteristic.

2. The configuration according to claim 1, wherein:

said grating device has an optical grating and defines a first optical free-radiating region and a second optical free-radiating region;

said first optical free-radiating region is provided between the common spatial point and said optical grating; and said second optical free-radiating region is provided between said optical grating and the separate spatial points.

3. The configuration according to claim 2, wherein:

said optical grating includes a plurality of further strip-shaped optical waveguides;

said further strip-shaped optical waveguides have respective first end faces, respective second end faces, and respective optical lengths between said first and second end faces; and said first end faces face the common spatial point, said second end faces respectively face the separate spatial points, and the optical lengths of said further strip-shaped optical waveguides differ from one another.

* * * * *